Oct. 28, 1941. A. L. LANGEL 2,260,782
MULTIPLE UNIT BAKING PAN
Filed Sept. 15, 1939 2 Sheets-Sheet 2
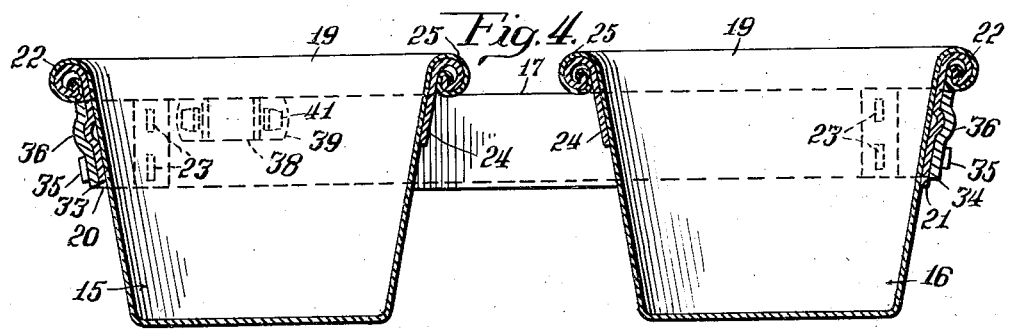
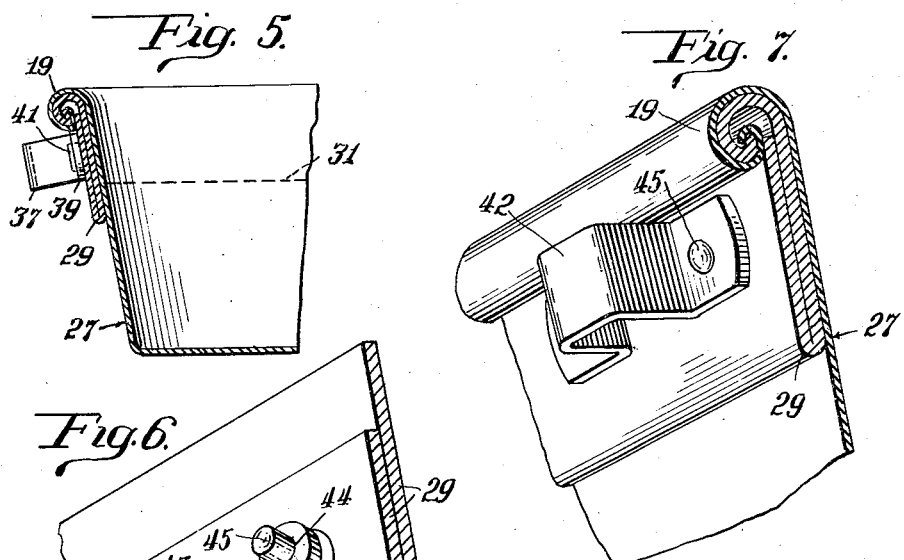
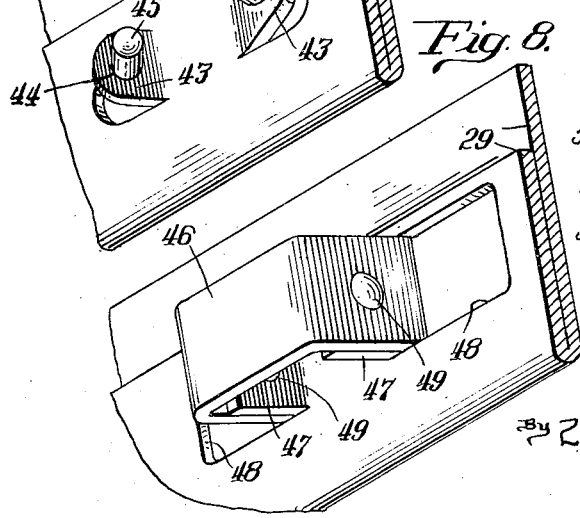
Inventor-
Adrien L. Langel,
By Zabel, Carlson, Gritzbaugh and Wiles,
Attorneys Patented Oct. 28, 1941

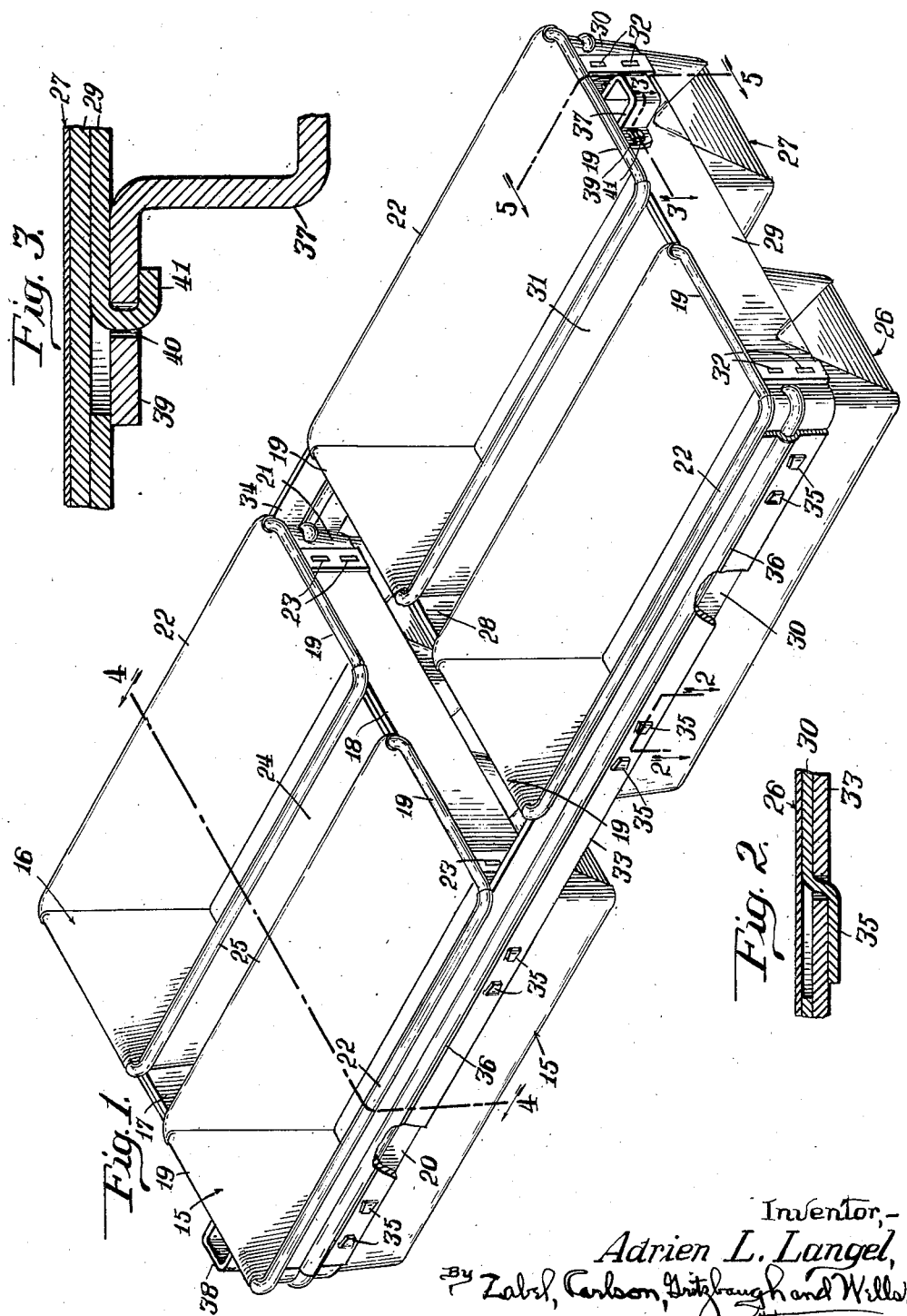

2,260,782

UNITED STATES PATENT OFFICE 2,260,782

MULTIPLE UNIT BAKING PAN

Adrien L. Langel, Chicago, Ill., assignor to Chicago Metallic Manufacturing Company, Chicago, Ill., a corporation of Illinois Application September 15, 1939, Serial No. 295,021

12 Claims. (Cl. 53—6)

This invention relates to baking pan construction and it has for its object the provision of a new and improved form and arrangement of parts by which a plurality of pans are connected together in unit form and a plurality of such units then are connected together. The invention comprises the provision of novel means for making the several connections whereby the construction shall be very strong while at the same time the weight of the parts and the work of assembling the parts shall be kept to a minimum. It is another object of this invention to provide an improved form of spacing lug means for the multiple pan construction, together with an improved arrangement of mounting means for such lugs.

It is another object of this invention to improve devices of this type in sundry details hereinafter pointed out. The preferred means by which the several objects have been attained are illustrated in the accompanying drawings, in which—

Fig. 1 is a perspective view of a pan structure embodying the preferred form of the invention;

Figs. 2 and 3 are enlarged detail views taken substantially at the horizontal line 2—2 and the horizontal line 3—3, respectively, of Fig. 1;

Figs. 4 and 5 are vertical sectional views taken substantially at the line 4—4 and the line 5—5, respectively, of Fig. 1;

Fig. 6 is an outside face view of a fragmentary portion of an end bar designed for use with a structure such as is shown in Fig. 1 but showing a modified arrangement of the parts for securing a spacing lug in position on the structure;

Fig. 7 is a view similar to Fig. 6 but with a section of the adjacent pan secured to the bar on its inner face and with a spacing lug secured in position on its outer face;

Fig. 8 is a view similar to Fig. 7 but with the pan omitted and showing a modified form of construction; and Fig. 9 is a diagrammatic view showing a changed form of pan structure.

Referring now to Figs. 1 to 5 inclusive, in which corresponding parts are indicated by the same reference characters, 15 and 16 indicate two pans arranged side by side in spaced relation to each other. At opposite ends of the pans 15 and 16, end bars 17 and 18 are provided, each comprising a strip of sheet metal doubled upon itself along its intermediate longitudinal line so as to provide two plies in face to face engagement with each other. The inner ply of each of the bars 17 and 18 is somewhat wider than the outer ply, having its upper edge portion rolled tightly with the end wall of the pan into the form of a bead, as indicated at 19, so as to provide a strong and rigid connection between the bar and the pans. Along the outer side faces of the pans 15 and 16, bars 20 and 21 are provided, as shown in Fig. 4, such bars having their upper edge portions rolled tightly with the side wall portions of the pans to form beads at 22 by which the bars are rigidly connected with the pans. At their ends, the bars 20 and 21 are turned about the corners of the pans to bring their end portions into engagement with the end bars 17 and 18 in position to be spot welded thereto, as indicated at 23 in Fig. 1.

By the use of the construction above described, the pans 15 and 16 are very strongly connected together and are very strongly reinforced. For further reinforcing the structure, bars 24 are provided along the faces of the inner side walls of the pans, as is shown in Fig. 4, the upper edge portions of the bars 24 being rolled at 25 with the side wall portions of the pans for forming beads or sleeves corresponding substantially to the beads or sleeves at 22 as above described.

A second pair of pans 26 and 27 similar in every way to the pans 15 and 16 are provided, connected together by end bars 28 and 29 corresponding in construction and arrangement with the end bars 17 and 18, with bars 30 and 31 along the sides of the pans corresponding with the bars 20, 21 and 24 as above described. The bars 30 are connected with the end bars 28 and 29 by spot welding at 32 as shown in Fig. 1.

In the arrangement shown in Fig. 1, the pair of pans 15 and 16 are connected with the pair of pans 26 and 27 by means of side bars 33 and 34 which extend along the outer faces of the bars 20, 21 and 30. As is best shown in Figs. 1 and 2, the bars 33 and 34 are provided with openings therethrough at intervals therealong, through which openings extend tongues 35 struck up from the bars 20, 21 and 30, such tongues 35 being bent down tightly upon the outer faces of the side bars 33 and 34 for holding such bars 33 and 34 very strongly in position so as to hold the four pans very rigidly and strongly in position with respect to each other. For reinforcing the connection of the bars 33 and 34 with the bars 20, 21 and 30, interfitting ribs and grooves are provided in said bars as is indicated at 36 in Fig. 4, whereby the bars 33 and 34 are held against vertical movement with respect to the bars 20, 21 and 30 so as to greatly strengthen the assembly as a whole.

For holding an assembly of pans as shown in Fig. 1 from the adjacent similar assembly in an oven, spacing devices are provided. In the arrangement shown the spacing devices are in the form of brackets 37 and 38 bent into channel form from strips of sheet metal. In the arrangement shown in Figs. 1 to 5, the legs of the channel brackets are turned outwardly to provide securing flanges 39 provided with openings 40 therethrough to receive tongues 41 struck up from the outer plies of the end bars 17 and 29. As is clearly indicated in Fig. 3, the tongues 41 are bent downwardly into tight engagement with the outer faces of the flanges 39 for holding the brackets 37 and 38 rigidly in position upon the assembly so as to serve as spacers between adjacent pan assemblies.

Referring now to Figs. 6 and 7, in which a modified form of means is shown for securing a spacing bracket 42 in position upon an end bar 29, for example, as is clearly shown in Fig. 6 the outer ply of the end bar 29 has short tongues 43 struck outwardly therefrom with openings at 44 therethrough for the insertion of rivets 45 into position therein. When the tongues 43 are pressed back again into the plane of the outer ply of the end bar, the rivets 45 are held non-removably in position so as to receive the bracket 42 in position thereon. The ends of the rivets are spread with respect to the openings in the bracket 42 in the usual manner for holding the bracket rigidly in position.

In Fig. 8, a still further modification is shown of the means for securing a spacing bracket 46 in position upon the end bar 29. In this arrangement, tongues 47 are struck up from the outer ply of the end bar so as to leave openings 48 in said ply. The legs of the bracket 46 are then inserted into the openings 48 and are secured to the tongues 47 by means of bolts or rivets 49 so as to be held rigidly in position.

In the arrangement shown in Fig. 9, three pans 50, 51 and 52 are shown connected side by side in spaced relation to each other by end bars 53 and 54 which in turn are connected together at each end by means of a bar 55 corresponding with the bars 20, 21 and 30 of the construction first described, the bars 53 and 54 being rolled over tightly with the end wall portions of the pans into the form of beads and the bars 55 being likewise rolled over tightly with the outside side walls of the pans. In the arrangement here shown, the spacing brackets 37 and 38 are omitted, spacing brackets 56 being employed instead, such spacing brackets 56 being similar to the brackets 37 and 38 and being secured in position by tongues formed with the bars 55 similar to the tongues 35 of said bars 20, 21 and 30 (see Figs. 1 and 2).

By the provision of the spacing brackets as above described, the pan structures are kept spaced both from adjacent pan structures and also from the oven walls so as to maintain substantially uniform spaces for the circulation of the heated air between the pans. By the connection of the spacing brackets to the pan structures by means of fastening tongues 41 and 35 formed with the several bars, and by the connection of the side bars 33 and 34 with the initial pan assemblies by the use of the fastening tongues 35, it is made unnecessary to insert a rivet through the wall of the pan at any point, the wall of the pan being thus left smooth and unbroken at all points where the loaf has contact with the pan.

While Fig. 1 of the drawings shows only two pans connected side by side in spaced relation to each other, and only two sets of such two-pan assemblies connected together in the complete pan structure, the invention is not to be limited at all to a four-pan arrangement, since any desired number of pans may be initially connected together by the use of the end bars as described, and any desired number of such side by side pan assemblies may then be connected together by the use of the side bars, the end bars and the side bars being made of such length as is required for the arrangement to be worked out.

While the form and construction of the parts as shown in the drawings and as above described are preferred, the invention is not to be limited to such arrangement except so far as the claims may be so limited, it being understood that changes might well be made in the arrangement without departing from the spirit of the invention.

I claim:

1. In a multiple unit baking pan, the combination of two pans arranged end to end in spaced relation to each other, a metal bar rigidly connected with the side face of each of said pans, a metal side bar extending along the outer faces of said first-named two bars, interengaging ribs and grooves in said bars longitudinally thereof for preventing vertical movement of said side bar with respect to said first-named two bars, and means for connecting said side bar rigidly with said first-named bars independently of the pans serving to hold the pans rigidly in position with respect to each other.

2. In a multiple unit baking pan, the combination of two pans arranged end to end in spaced relation to each other, a metal bar rigidly connected with the side face of each of said pans, a metal side bar extending along the outer faces of said first-named two bars, interengaging ribs and grooves in said bars longitudinally thereof for preventing vertical movement of said side bar with respect to said first-named two bars and tongues carried by said first-named bars extending through openings in said side bar and bent over snugly for holding said bars rigidly in engagement with each other for holding the pans rigidly in position with respect to each other.

3. In a multiple unit baking pan, the combination of two pans arranged end to end in spaced relation to each other, a metal bar along the side face of each of said pans and connected rigidly therewith by having its upper edge portion rolled into tightly interlocked relation with the side wall of the pan, a metal side bar extending along the outer faces of said first-named two bars, interengaging ribs and grooves in said bars longitudinally thereof for preventing vertical movement of said side bar with respect to said first-named two bars, and means for connecting said side bar rigidly with said first-named two bars for holding said pans rigidly in position with respect to each other.

4. In a multiple unit baking pan, the combination of four pans arranged in pairs side by side, end bars at opposite ends of each pair, other bars along the outer side faces of the pans rigidly connected with the ends of said end bars, means for connecting said bars with the ends and sides of said pans, and side bars rigidly connected with said other bars independently of said pans for holding the pans rigidly in position with respect to each other.

5. In a multiple unit baking pan, the combination of a plurality of pans arranged in groups side by side, end bars at opposite ends of the pans of each group, two other bars along the outer side faces of the pans rigidly connected with the ends of said end bars, beads in the form of tightly interfitting sleeves rolled on the upper edge portions of said bars and the adjacent sides and ends of the pans, and side bars rigidly connected with said two other bars independently of said pans for holding the pans rigidly in position with respect to each other.

6. In a multiple unit baking pan, the combination of a plurality of pans arranged in groups side by side, end bars at opposite ends of the pans of each group, two other bars along the outer side faces of the pans rigidly connected with the ends of said end bars, beads in the form of tightly interfitting sleeves rolled on the upper edge portions of said bars and the adjacent sides and ends of the pans, side bars extending along opposite sides of the assembly in engagement with said two other bars and having openings therethrough at intervals therealong, and tongues on said two other bars extending through said openings in said side bars and bent over tightly for holding said side bars rigidly in position.

7. In a multiple unit baking pan, the combination of a plurality of pans arranged in groups side by side, end bars at opposite ends of the pans of each group, two other bars along the outer side faces of the pans rigidly connected with the ends of said end bars, beads in the form of tightly interfitting sleeves rolled on the upper edge portions of said bars and the adjacent sides and ends of the pans, side bars extending along opposite sides of the assembly in engagement with said two other bars and having openings therethrough at intervals therealong, interengaging ribs and grooves in said two other bars and said side bars longitudinally thereof for preventing vertical movement of said side bars with respect to said two other bars, and tongues on said two other bars extending through said openings in said side bars and bent over tightly for holding said side bars rigidly in position.

8. In a multiple unit baking pan, the combination of two pans in spaced relation side by side, end bars at opposite ends of said pans each in the form of a strip of metal bent along an intermediate line longitudinally thereof, with the inner plies of the end bars rolled with the end walls of the pans into beads for securing the parts rigidly together, and other bars along the outer faces of the pans connected at their ends with said end bars and rolled at their upper edges with the adjacent side walls of the pans into beads for connecting said other bars rigidly with the pans.

9. In a multiple unit baking pan, the combination of two pans in spaced relation side by side, end bars at opposite ends of said pans each in the form of a strip of metal bent along an intermediate line longitudinally thereof, means for rigidly connecting said end bars with said pans, tongues struck outwardly from the outer ply portions of said end bars, and spacing members having openings therethrough held rigidly in position on said end bars by said tongues extending through said openings and bent over tightly on said members.

10. In a multiple unit baking pan, the combination of two pans in spaced relation side by side, end bars at opposite ends of said pan each in the form of a strip of metal bent along an intermediate line longitudinally thereof, means for rigidly connecting said end bars with said pans, tongues struck outwardly from the outer ply portions of said end bars, and spacing brackets formed of strips of metal bent into channel form having openings through their leg portions and held rigidly in position on said end bars by said tongues extending through said openings and bent over tightly on said brackets.

11. In a multiple unit baking pan, the combination of two pans in spaced relation side by side, end bars at opposite ends of said pans each in the form of a strip of metal bent along an intermediate line longitudinally thereof, means for rigidly connecting said end bars with said pans, tongues struck outwardly from the outer ply portions of said end bars having openings therethrough, rivets mounted in said openings so as to be held non-removably in position when said tongues are bent back into the plane of the bar, and spacing members having openings therethrough held rigidly in position on said rivets so as to extend outwardly from said end bars.

12. In a multiple unit baking pan, the combination of two pans in spaced relation side by side, end bars at opposite ends of said pans each in the form of a strip of metal bent along an intermediate line longitudinally thereof, means for rigidly connecting said end bars with said pans, tongues struck outwardly from the outer ply portions of said end bars having openings therethrough, and spacing brackets formed from strips of metal bent into channel form and having openings through their leg portions and held rigidly in position on said end bars by securing devices mounted in said openings in the leg portions and said tongues for holding said brackets in position extending outwardly from said end bars.

ADRIEN L. LANGEL.